US 9,740,553 B2

(12) United States Patent
Holmer et al.

(10) Patent No.: US 9,740,553 B2
(45) Date of Patent: Aug. 22, 2017

(54) MANAGING POTENTIALLY INVALID RESULTS DURING RUNAHEAD

(71) Applicant: NVIDIA Corporation, Santa Clara, CA (US)

(72) Inventors: Bruce Holmer, Belmont, CA (US); Guillermo J. Rozas, Los Gatos, CA (US); Alexander Klaiber, Mountain View, CA (US); James van Zoeren, Albuquerque, NM (US); Paul Serris, San Jose, CA (US); Brad Hoyt, Portland, OR (US); Sridharan Ramakrishnan, Hillsboro, OR (US); Hens Vanderschoot, Tigard, OR (US); Ross Segelken, Portland, OR (US); Darrell D. Boggs, Aloha, OR (US); Magnus Ekman, Alameda, CA (US)

(73) Assignee: NVIDIA CORPORATION, Santa Clara, CA (US)

(*) Notice: Subject to any disclaimer, the term of this patent is extended or adjusted under 35 U.S.C. 154(b) by 790 days.

(21) Appl. No.: 13/677,085

(22) Filed: Nov. 14, 2012

(65) Prior Publication Data
US 2014/0136891 A1    May 15, 2014

(51) Int. Cl.
*G06F 15/00* (2006.01)
*G06F 7/38* (2006.01)
(Continued)

(52) U.S. Cl.
CPC ........ *G06F 11/0793* (2013.01); *G06F 9/3842* (2013.01); *G06F 9/3865* (2013.01);
(Continued)

(58) Field of Classification Search
CPC ................ G06F 9/3842; G06F 9/3861
See application file for complete search history.

(56) References Cited

U.S. PATENT DOCUMENTS

| 5,487,146 | A | * | 1/1996 | Guttag | ................ | G09G 5/393 |
| | | | | | | 345/519 |
| 5,721,855 | A | * | 2/1998 | Hinton | ................ | G06F 9/30152 |
| | | | | | | 711/E12.049 |

(Continued)

FOREIGN PATENT DOCUMENTS

| CN | 1519728 | 8/2004 |
| CN | 1629799 | 6/2005 |

(Continued)

OTHER PUBLICATIONS

Adve, S. et al., "Shared Memory Consistency Models: A Tutorial", WRL Research Report 95/7, Western Digital Laboratory, Sep. 1995, 32 pages.

(Continued)

*Primary Examiner* — Hyun Nam

(57) ABSTRACT

Embodiments related to managing potentially invalid results generated/obtained by a microprocessor during runahead are provided. In one example, a method for operating a microprocessor includes causing the microprocessor to enter runahead upon detection of a runahead event. The example method also includes, during runahead, determining that an operation associated with an instruction referencing a storage location would produce a potentially invalid result based on a value of an architectural poison bit associated with the storage location and performing a different operation in response.

20 Claims, 3 Drawing Sheets

(51) Int. Cl.
*G06F 11/07* (2006.01)
*G06F 11/00* (2006.01)
*G06F 9/38* (2006.01)

(52) U.S. Cl.
CPC ........ *G06F 11/004* (2013.01); *G06F 11/0721* (2013.01); *G06F 11/0763* (2013.01)

(56) References Cited

U.S. PATENT DOCUMENTS

| | | |
|---|---|---|
| 5,864,692 A | 1/1999 | Faraboschi et al. |
| 5,870,582 A | 2/1999 | Cheong et al. |
| 5,956,753 A | 9/1999 | Glew et al. |
| 6,037,946 A | 3/2000 | Takeda |
| 6,484,254 B1 | 11/2002 | Chowdhury et al. |
| 6,519,694 B2 | 2/2003 | Harris |
| 6,665,792 B1 | 12/2003 | Merchant et al. |
| 7,010,648 B2 | 3/2006 | Kadambi et al. |
| 7,062,631 B1 | 6/2006 | Klaiber et al. |
| 7,117,330 B1 | 10/2006 | Alverson et al. |
| 7,194,604 B2 | 3/2007 | Bigelow et al. |
| 7,293,161 B1 | 11/2007 | Chaudhry et al. |
| 7,421,567 B2 | 9/2008 | Eickemeyer et al. |
| 7,587,584 B2 | 9/2009 | Enright et al. |
| 7,752,627 B2 | 7/2010 | Jones et al. |
| 7,873,793 B1 | 1/2011 | Rozas et al. |
| 7,890,735 B2 | 2/2011 | Tran |
| 8,035,648 B1 | 10/2011 | Wloka et al. |
| 8,707,011 B1 | 4/2014 | Glasco et al. |
| 9,632,976 B2 | 4/2017 | Rozas et al. |
| 2003/0018685 A1 | 1/2003 | Kalafatis et al. |
| 2003/0196010 A1 | 10/2003 | Forin et al. |
| 2004/0128448 A1 | 7/2004 | Stark et al. |
| 2005/0041031 A1 | 2/2005 | Diard |
| 2005/0055533 A1* | 3/2005 | Kadambi ............ G06F 9/3842 712/1 |
| 2005/0138332 A1* | 6/2005 | Kottapalli ............ G06F 9/3824 712/218 |
| 2005/0154831 A1 | 7/2005 | Steely, Jr. et al. |
| 2006/0010309 A1 | 1/2006 | Chaudhry et al. |
| 2006/0095678 A1* | 5/2006 | Bigelow ............ G06F 9/3824 711/137 |
| 2006/0149931 A1 | 7/2006 | Haitham et al. |
| 2006/0174228 A1 | 8/2006 | Radhakrishnan et al. |
| 2006/0179279 A1 | 8/2006 | Jones et al. |
| 2006/0212688 A1 | 9/2006 | Chaudhry et al. |
| 2006/0277398 A1 | 12/2006 | Akkary et al. |
| 2007/0074006 A1 | 3/2007 | Martinez et al. |
| 2007/0174555 A1 | 7/2007 | Burtscher et al. |
| 2007/0186081 A1 | 8/2007 | Chaudhry et al. |
| 2007/0204137 A1 | 8/2007 | Tran |
| 2009/0019317 A1* | 1/2009 | Quach ................ G06F 11/3419 714/47.1 |
| 2009/0327661 A1 | 12/2009 | Sperber et al. |
| 2010/0199045 A1 | 8/2010 | Bell et al. |
| 2010/0205402 A1 | 8/2010 | Henry et al. |
| 2010/0205415 A1 | 8/2010 | Henry et al. |
| 2011/0264862 A1 | 10/2011 | Karlsson et al. |
| 2012/0023359 A1 | 1/2012 | Edmeades et al. |
| 2012/0089819 A1 | 4/2012 | Chaudhry et al. |
| 2013/0124829 A1 | 5/2013 | Chou et al. |
| 2014/0082291 A1 | 3/2014 | Van Zoeren et al. |
| 2014/0122805 A1 | 5/2014 | Ekman et al. |
| 2014/0164736 A1 | 6/2014 | Rozas et al. |
| 2014/0164738 A1 | 6/2014 | Ekman et al. |
| 2014/0281259 A1 | 9/2014 | Klaiber et al. |
| 2015/0026443 A1 | 1/2015 | Kumar et al. |

FOREIGN PATENT DOCUMENTS

| | | |
|---|---|---|
| CN | 1831757 | 9/2006 |
| CN | 102184127 | 9/2011 |
| CN | 103793205 | 5/2014 |
| DE | 102013218370 A1 | 3/2014 |
| EP | 0671718 | 9/1995 |
| GB | 2287111 | 9/1995 |
| TW | 200405201 | 4/2004 |
| TW | 200529071 | 9/2005 |
| TW | I263938 | 10/2006 |
| TW | I275938 | 3/2007 |
| TW | 200723111 | 6/2007 |
| TW | 200809514 | 2/2008 |
| TW | I315488 | 10/2009 |
| TW | 201032627 | 9/2010 |
| TW | 201112254 | 4/2011 |
| TW | I425418 | 2/2014 |

OTHER PUBLICATIONS

Dundas, J. et al., "Improving Data Cache Performance by Pre-executing Instructions Under a Cache Miss", Proceedings of the 1997 International Conference on Supercomputing, Jul. 1997, 9 pages.

Mutlu, O. et al., "Runahead Execution: An Alternative to Very Large Instruction Windows for Out-of-order Processors," Ninth International Symposium on High-Performance Computer Architecture, Anaheim, CA., Feb. 11, 2003, 12 pages.

"Intel Itanium Architecture Software Developer's Manual", Intel, http://www.intel.com/design/itanium/manuals/iiasdmanual.htm, 1 page.

Ekman, M. et al., "Instruction Categorization for Runahead Operation", U.S. Appl. No. 13/708,544, filed Dec. 7, 2012, 32 pages.

Ekman, M. et al., "Selective Poisoning of Data During Runahead", U.S. Appl. No. 13/662,171, filed Oct. 26, 2012, 33 pages.

Rozas, J. et al., "Lazy Runahead Operation for a Microprocessor", U.S. Appl. No. 13/708,645, filed Dec. 7, 2012, 32 pages.

Chaudry, S. et al., "High-Performance Throughput Computing," Micro, IEEE 25.3, pp. 32-45, May 2005, 14 pages.

Dehnert, et al., The Transmeta Code Morphing Software: using speculation, recovery, and adaptive retranslation to address real-life challenges, Mar. 23, 2003, IEEE, CGO '03 Proceedings of the international symposium on Code generation and optimization: feedback-directed and runtime optimization, pp. 15-24.

Holmer, B., et al., "Managing Potentially Invalid Results During Runahead", U.S. Appl. No. 13/677,085, filed Nov. 14, 2012, 29 pages.

Nvidia Corp. Akquirierung spekulativer Genehmigung jur gemeinsam genutzten Speicher, Mar. 20, 2014, SW102013218370 A1, German Patent Office, All Pages.

Rozas, Guillermo J. et al., "Queued Instruction Re-Dispatch After Runahead," U.S. Appl. No. 13/730,407, filed Dec. 28, 2012, 36 pages.

Altera—"Implementing a Queue Manager in Traffic Management Systems", Feb. 2004, pp. 1-8.

Wikipedia article, "Instruction Prefetch," https://en.wikipedia.org/wiki/Instruction_prefetch, downloaded May 23, 2016.

Wikipedia article, "x86," https://en.wikipedia.org/wiki/X86, downloaded May 23, 2016.

* cited by examiner

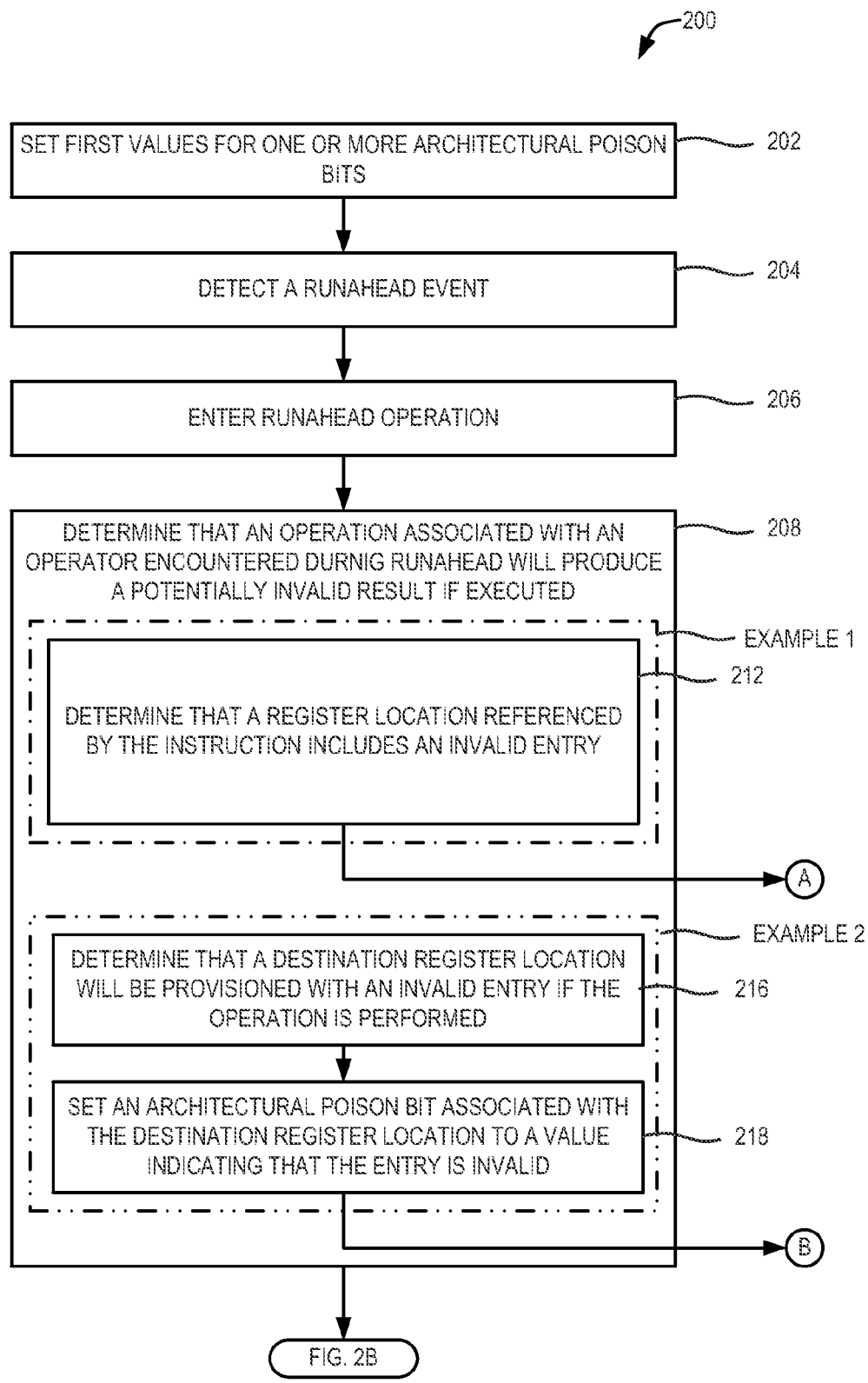

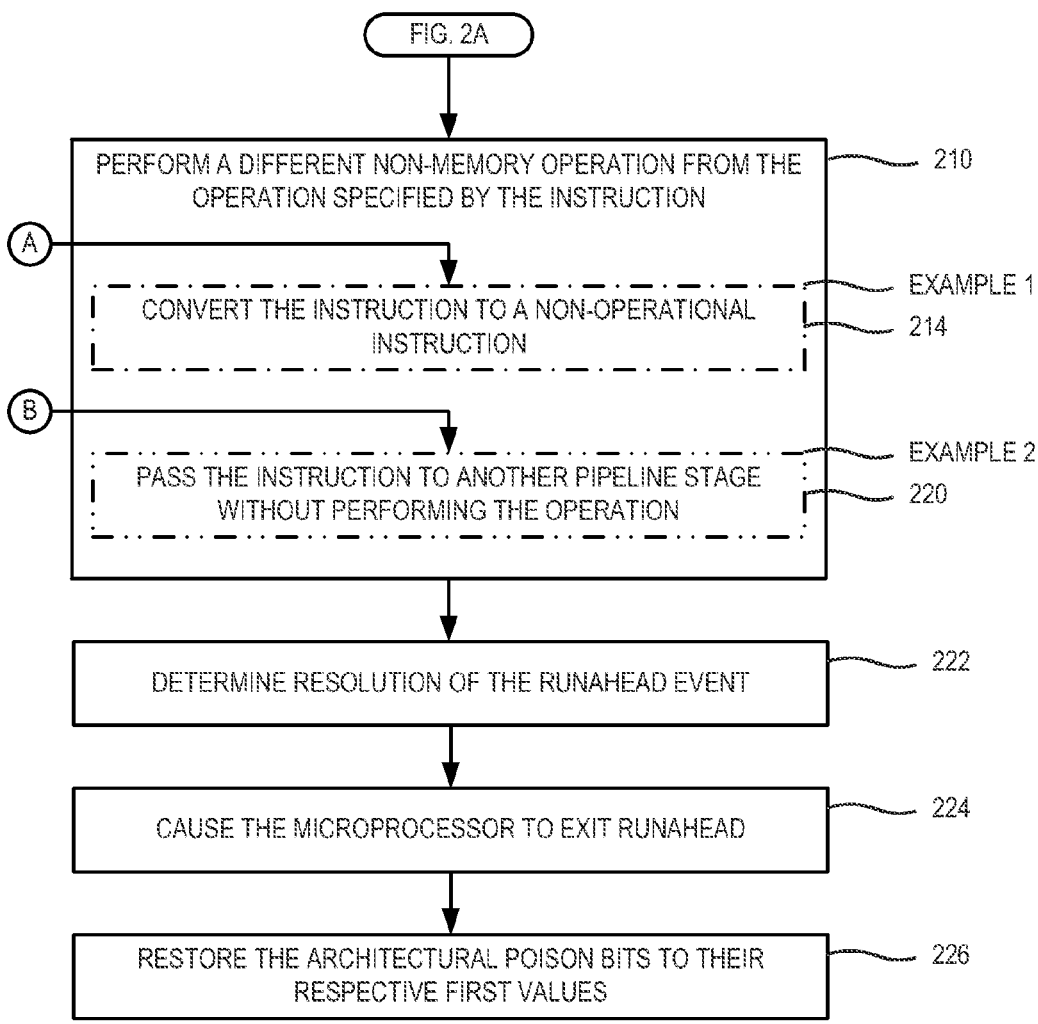

MANAGING POTENTIALLY INVALID RESULTS DURING RUNAHEAD

BACKGROUND

Instructions in microprocessors are often re-dispatched for execution one or more times due to pipeline errors or data hazards. For example, an instruction may need to be re-dispatched when an instruction refers to a result that has not yet been calculated or retrieved. Because it may be beneficial to uncover other independent stalls among subsequent instructions, the microprocessor may perform a runahead configured to detect other misses while the initial miss is being resolved. While runahead may uncover other potential misses, continued execution with missing or invalid data may pollute the cache.

BRIEF DESCRIPTION OF THE DRAWINGS

FIG. 2A shows a flow chart illustrating a portion of a method for managing potentially invalid results during runahead according to an embodiment of the present disclosure.

FIG. 2B shows a flow chart illustrating another portion of the method for managing potentially invalid results during runahead shown in FIG. 2A.

DETAILED DESCRIPTION

Figure 1:
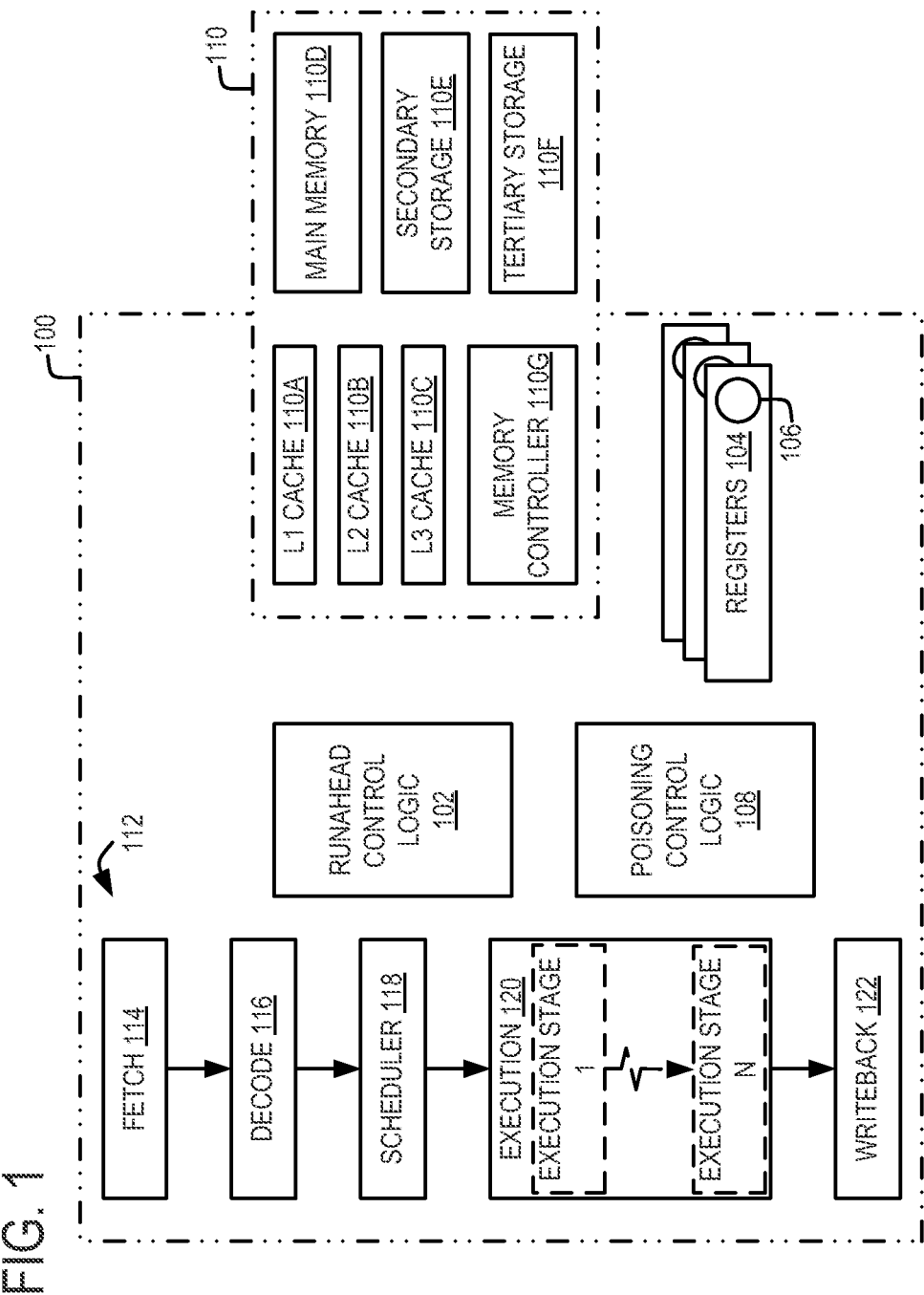
FIG. 1 schematically shows a microprocessor according to an embodiment of the present disclosure.

In modern microprocessors, instructions are often executed in a pipeline. Such instructions may be issued individually or as bundles of micro-operations to various execution mechanisms in the pipeline. Regardless of the form that an instruction takes when issued for execution, when the instruction is issued, it may not be known whether execution of the instruction will complete or not. Put another way, it is not known at dispatch whether a miss or an exception will arise during execution of the instruction. It may take some time to resolve some misses/exceptions before the microprocessor is able to make progress on the instructions. Thus, the microprocessor may stall while attempting to resolve the underlying cause of the long-latency event.

Some microprocessors may be configured to speculatively execute instructions while the underlying cause for a stall is being resolved. The speculative execution is typically aimed at discovering other potential stalls so that the microprocessor may begin resolving those as well, potentially saving processing time. In some settings, it may be desirable to uncover as many potential stalls as possible before the initial stall event is resolved and normal operation resumes. Thus, the microprocessor may need to speculatively process as many instructions as possible. However, because the microprocessor is operating in a regime where it is probable that some of the results generated will be invalid, one or more stalls uncovered during the speculative execution may slow processing.

A common pipeline execution stall that may arise during execution of an instruction is a load miss. Put another way, a stall may result from a load request where there is requested data or an instruction that is not present at a particular location in cached memory, causing a long-latency event while the data or instruction is retrieved from another location (e.g., at a higher cache level). Such load misses may trigger an entrance into a runahead mode of operation (hereafter referred to as "runahead") that is configured to detect, for example, other cache misses (e.g., store misses and/or load misses), misses in translation lookaside buffers (e.g., for instructions or data), and/or branch mispredicts while the initial load miss is being resolved.

As used herein, runahead describes any suitable speculative execution scheme performed during a long-latency event that triggers an unresolved state in the microprocessor. It will be appreciated that the nature and identity of such long-latency events may vary. Other non-limiting examples of such event include store misses and some long-latency floating point operations (e.g., denormal square root operations). Once the runahead-triggering event is detected, the state of the microprocessor (e.g., the registers and other suitable states) may be checkpointed so that the microprocessor may return to that state after runahead. The microprocessor then continues executing in a working state during runahead. After the initial long-latency event is resolved, the microprocessor exits runahead, restores the checkpointed state, and normal operation resumes.

Because runahead is a speculative execution scheme, some of the values resulting from runahead may typically be invalid. While runahead may uncover other potential misses, continued execution with missing or invalid data may pollute the cache. Some past approaches augment registers with poison bits during runahead so that invalid data may be tracked during runahead. However, since tracking invalid data may only occur during runahead in some settings, poison bits that are not architecturally visible may have no meaning outside of runahead. As used herein, architectural visibility refers to the ability for an architecturally-visible object to be perceived/viewed from outside of the microprocessor. The runahead state is not architecturally-visible because no changes are made to the microprocessor state during runahead. Put differently, the observed state of the microprocessor immediately after runahead is the same as the observed state of the microprocessor immediately before runahead.

Poison bits may also be used to indicate various fault conditions outside of runahead. For example, an architecturally-visible poison bit may indicate that a destination register location will be provisioned with an invalid entry. Such architectural poison bits may be visible to the microprocessor architecture so that a fault condition may be matched with a register location during normal, non-runahead operation. It may be illegal for an intervening runahead event to cause the valid/invalid state information to become lost during runahead. Therefore, architecturally-visible poison bits are typically kept separate from poison bits used to track the validity of data during runahead. Put differently, because the architectural state of the microprocessor is frozen during runahead, poison bits that exist as a part of the architecture are also frozen. Consequently, a duplicate set of poison bits may exist within the microprocessor, potentially leading to inefficiencies in hardware design and utilization for the device. In runahead-compatible architectures that employ architecturally-visible poison bits, this might result in three poison bits per register: a working state version of an architectural poison bit, a checkpointed version of the architectural poison bit, and a runahead poison bit.

Accordingly, the embodiments described herein relate to methods and hardware configured to manage potentially invalid results generated/obtained during runahead. For example, one embodiment of a method for operating a microprocessor includes causing the microprocessor to enter runahead upon detection of a runahead event. The example method also includes, during runahead, determining that an operation associated with an instruction referencing a storage location would produce a potentially invalid result based on a value of an architectural poison bit associated with the storage location and performing a different operation in response. Changing the operation performed during runahead and/or overloading the value of an architectural poison bit during runahead may allow the microprocessor to make forward progress during runahead with the reassurance that the microprocessor state will be restored to a pre-runahead state after runahead ends.

As used herein, overloading an architectural poison bit refers to providing both architectural poison and runahead poison functionality on a single bit during runahead. For example, the architectural poison bit may be checkpointed upon entry into runahead. During runahead, the working state version of the architectural poison bit may be used to represent architectural and/or runahead poison. Upon exit from runahead, the checkpointed version of the architectural poison bit is restored, so that fewer bits may be used for tracking poison relative to the example described above.

As used herein, an operator specifies how data is to be arithmetically or logically manipulated by an instruction. Thus, an operator may include arithmetic or logical opcodes that reference operands in instructions. Operands specify the data subject to the operation associated with operator as arguments. In some scenarios, an operand may also specify a data location associated with the arguments, such as register locations. Operation refers to the arithmetic or logical manipulation function associated with the operator. Thus, an instruction to add the value X at register location A with the value Y at register location B includes an "add" operator. The instruction also includes operands X and Y, and may include register locations A and B. The example method also includes performing an operation other than an operation specified by the operator.

As introduced above, runahead may help identify other potential runahead-triggering events while the original runahead-triggering event is being resolved. Therefore, it may be helpful to increase instruction throughput during runahead, as increasing the number of instructions processed may increase the opportunity to detect an additional runahead-triggering event. Detecting potentially invalid results may allow those results to be tracked during runahead (e.g., using an architectural poison bit associated with a related register location in some embodiments), possibly avoiding cache corruption while advancing progress of the speculative execution so that other potential long-latency events may be discovered. Further, because the values generated during runahead may often be invalid, changing the behavior of the microprocessor in response by performing a different action from the specified operator or altering the operator specified may avoid delays and speed instruction processing during runahead.

FIG. 1 schematically depicts an embodiment of a microprocessor 100 that may be employed in connection with the systems and methods described herein. The embodiment of microprocessor 100 shown in FIG. 1 depicts runahead control logic 102. Runahead control logic 102 controls entry to and exit from runahead mode for microprocessor 100. In some embodiments, runahead control logic 102 may also control memory operations related to entry and exit from runahead. For example, on entry to runahead, portions of microprocessor 100 may be checkpointed to preserve the state of microprocessor 100 while a non-checkpointed working state version of microprocessor 100 speculatively executes instructions during runahead. In some such embodiments, runahead control logic 102 may restore microprocessor 100 to the checkpointed state upon exit from runahead.

Microprocessor 100 also includes processor registers 104. In some embodiments, registers 104 may be included in a general purpose register file or otherwise suitably distributed within microprocessor 100. Registers 104 store data and/or instructions used during operation. For example, a pipeline stage may obtain data from an input register, perform a specified operation using the obtained data, and then store the result at a destination register. It will be appreciated that the labels "destination register" and "input register" are relative terms. For example, a destination register for a first operation may act as an input register for another operation; likewise, an input register for one operation may have served as a destination register for a prior operation, and so on.

In the embodiment shown in FIG. 1, each register 104 is augmented with an architectural poison bit 106. Each architectural poison bit 106 is configured so that its value may indicate the trustworthiness of an associated location in register 104 regardless of whether the microprocessor is in runahead or in non-runahead operation. By using common poison bits to track poisoning during normal operation and runahead, the amount of storage area in some embodiments of microprocessor 100 may be comparatively less than in other microprocessors where runahead poison bits are used exclusively during runahead and architectural poison bits are used exclusively during normal operation.

Outside of runahead, each architectural poison bit 106 is configured to indicate the validity/invalidity of the data or instruction included in the associated register 104, the bit being visible (e.g., able to be checked by explicit instructions) to the microprocessor architecture outside of runahead. During runahead, each architectural poison bit 106 is also configured to indicate the validity/invalidity of the data or instruction in the associated register 104. However, during runahead, each architectural poison bit 106 is visible to runahead control logic but is invisible to the microprocessor architecture. Accordingly, a status change for an architectural poison bit 106 during runahead does not affect the architectural state of the microprocessor because the data is not committed during runahead.

For example, in some embodiments, architectural poison bit 106 may be used to track microprocessor correctness outside of runahead. As used herein, microprocessor correctness refers to the functional validity of the microprocessor's architectural state. An action that maintains the functional validity of the microprocessor's architecture maintains the correctness of the microprocessor. Accordingly, in embodiments where architectural poison bits 106 keep track of microprocessor correctness, a particular architectural poison bit 106 may be set to an invalid state when associated with a register 104 having an entry that may invalidate the functional validity of the microprocessor architecture. Upon being updated with an entry that does not invalidate the functional validity of the microprocessor architecture, the value of that architectural poison bit 106 may be changed to a valid state.

As another example, in some embodiments, an architectural poison bit 106 may be used to indicate an invalid entry in register 104 so that normal, non-runahead operation may proceed in a speculative fashion without taking an exception. In one scenario, an architectural poison bit 106 associated with a particular register entry may be set to indicate that the register content is invalid in response to a translation look-aside buffer miss. By flagging the content as invalid, a load operation referencing the register location may occur speculatively. If a subsequent operation does not use the data from that register location prior to overwriting that register with valid data, that architectural poison bit 106 is cleared and operation proceeds in a non-speculative way. Put differently, an exception, stall, or replay is only taken if data from that register location is called for or otherwise referenced. This may avoid some stall conditions and speed instruction flow through microprocessor 100. In another scenario, an architectural poison bit 106 associated with a particular register entry may be set to indicate that the register content is invalid in response to a calculation that produces an invalid result, such as a divide-by-zero operation.

The value of one or more architectural poison bits 106 is preserved by checkpointing the microprocessor state upon entry into runahead. In other words, the value of a selected architectural poison bit 106 is checkpointed along with a register value (e.g., a value held in register 104) associated with that architectural poison bit 106. Once runahead is concluded, the microprocessor state is restored to the checkpointed version. Restoring the checkpointed state includes restoring the value of architectural poison bit 106 along with the register value held in the register 104 associated with that architectural poison bit 106. Thus, on exit from runahead architectural poison bits 106 exhibit their pre-runahead values. Because the values of architectural poison bits 106 are preserved by checkpointing, they may be used to track invalidities arising during runahead without affecting microprocessor correctness tracking.

The embodiment of microprocessor 100 shown in FIG. 1 also includes poisoning control logic 108 operative to determine that a particular instruction encountered during runahead would produce a potentially invalid result if an operation specified by that instruction is performed by the microprocessor. In some embodiments, poisoning control logic 108 may be operative to determine that a particular instruction will produce a potentially invalid result based upon a value for a particular architectural poison bit 106 associated with that instruction. In some embodiments, poisoning control logic 108 may be operative to adjust a value for a selected architectural poison bit 106 from a first value to a second value upon determining that the particular instruction associated with that architectural poison bit would produce a potentially invalid result. As used herein, a potentially invalid result refers to any result of an operation specified by an operator that might generate a potentially invalid result.

In addition to being operative to adjust the value of select architectural poison bits 106 during runahead, poisoning control logic 108 is also operative to cause microprocessor 100 to perform different operations from those specified by instructions associated with potentially invalid results. For example, an instruction that retrieves an invalid entry from an input register for arithmetic operation is likely to generate an invalid result during runahead. In some embodiments, upon making this determination, poisoning control logic 108 may cause microprocessor 100 not to perform the specified arithmetic operation. Instead, poisoning control logic 108 may mark a destination register associated with the instruction as invalid and proceed with runahead. This may allow runahead to traverse more code relative to processes that stall, potentially uncovering other runahead-triggering events. Because some or many of the operations performed during runahead may yield invalid results (e.g., because these operations may be tied to data subject to the cache miss that triggered runahead), performing computationally intensive arithmetic operations only to generate an invalid result may only slow runahead. Slowing operation during runahead may potentially reduce the ability of microprocessor 100 to uncover other potential runahead-triggering events before the original runahead-triggering event is resolved and normal operations resume. In contrast, skipping such computationally intense operations while tracking the invalidity associated therewith may speed instruction throughput during runahead so that other potential runahead-triggering events might be discovered.

While the embodiment shown in FIG. 1 depicts poisoning control logic 108 as an entity separate from other portions of microprocessor 100 for clarity, it will be appreciated that some or all of the functions of poisoning control logic 108 may be distributed among suitable portions of microprocessor 100. For example, in some embodiments, poisoning control logic 108 may be distributed among portions of scheduling logic and/or among portions of execution logic, as described in more detail below.

The embodiment of microprocessor 100 depicted in FIG. 1 also includes a memory hierarchy 110, which may include an L1 processor cache 110A, an L2 processor cache 110B, an L3 processor cache 110C, main memory 110D (e.g., one or more DRAM chips), secondary storage 110E (e.g., magnetic and/or optical storage units) and/or tertiary storage 110F (e.g., a tape farm). It will be understood that the example memory/storage components are listed in increasing order of access time and capacity, though there are possible exceptions.

A memory controller 110G may be used to handle the protocol and provide the signal interface required of main memory 110D and to schedule memory accesses. The memory controller can be implemented on the processor die or on a separate die. It is to be understood that the memory hierarchy provided above is non-limiting and other memory hierarchies may be used without departing from the scope of this disclosure.

Microprocessor 100 also includes a pipeline, illustrated in simplified form in FIG. 1 as pipeline 112. Pipelining may allow more than one instruction to be in different stages of retrieval and execution concurrently. Put another way, a set of instructions may be passed through various stages included in pipeline 112 while another instruction and/or data is retrieved from memory. Thus, the stages may be utilized while upstream retrieval mechanisms are waiting for memory to return instructions and/or data, engaging various structures such as caches and branch predictors so that other cache misses and/or branch mispredicts may potentially be discovered. This approach may potentially accelerate instruction and data processing by the microprocessor relative to approaches that retrieve and execute instructions and/or data in an individual, serial manner.

As shown in FIG. 1, pipeline 112 includes a plurality of units comprising fetch logic 114, decode logic 116, scheduler logic 118, execution logic 120, and writeback logic 122. It will be appreciated that the logic portions displayed in the embodiment of pipeline 112 shown in FIG. 1 are provided for illustrative purposes only and that the functionality described in more detail below may be arranged in any suitable manner. For example, some embodiments of pipeline 112 may include individually pipelined portions within one or more of the units (e.g., one or more of fetch logic 114, decode logic 116, and so on, may include individually pipeline portions) while some embodiments may combine portions of two or more logic portions within a single pipeline unit.

In the embodiment shown in FIG. 1, fetch logic 114 retrieves instructions from the memory hierarchy 110, typically from either unified or dedicated L1 caches backed by L2-L3 caches and main memory. Decode logic 116 decodes the instructions, for example by parsing operators/opcodes, operands, and addressing modes. Upon being parsed, the instructions are then scheduled by scheduler logic 118 for execution by execution logic 120.

In some embodiments, scheduling logic 118 may be configured to schedule instructions for execution in the form of instruction set architecture (ISA) instructions. Additionally or alternatively, in some embodiments, scheduling logic 118 may be configured to schedule bundles of micro-operations for execution, where each micro-operation corresponds to one or more ISA instructions or parts of ISA instructions. It will be appreciated that any suitable arrangement for scheduling instructions in bundles of micro-operations may be employed without departing from the scope of the present disclosure. For example, in some embodiments, a single instruction may be scheduling in a plurality of bundles of micro-operations, while in some embodiments a single instruction may be scheduled as a bundle of micro-operations. In yet other embodiments, a plurality of instructions may be scheduling as a bundle of micro-operations. In still other embodiments, scheduling logic 118 may schedule individual instructions or micro-operations, e.g., instructions or micro-operations that do not comprise bundles at all.

As shown in FIG. 1, the depicted embodiment of pipeline 112 includes execution logic 120 that may include one or more execution stages configured to execute instructions issued by scheduling logic 118. Any suitable number and type of execution stages may be included within execution logic 120. Once processed by execution logic 120, completed instructions may be stored in preparation for commitment by writeback logic 122. Writeback logic 122 alters the architectural state of microprocessor 100 by committing completed instructions to memory. Put another way, writeback logic 122 performs commit functionality for microprocessor 100.

It will be understood that the above stages shown in pipeline 112 are illustrative of a typical RISC implementation, and are not meant to be limiting. For example, in some embodiments, the fetch logic and the scheduling logic functionality may be provided upstream of a pipeline, such as compiling VLIW instructions or code-morphing. In some other embodiments, the scheduling logic may be included in the fetch logic and/or the decode logic of the microprocessor. More generally a microprocessor may include fetch, decode, and execution logic, each of which may comprise one or more stages, with mem and write back functionality being carried out by the execution logic. The present disclosure is equally applicable to these and other microprocessor implementations, including hybrid implementations that may use VLIW instructions and/or other logic instructions.

In the described examples, instructions may be fetched and executed one at a time, possibly requiring multiple clock cycles. During this time, significant parts of the data path may be unused. In addition to or instead of single instruction fetching, pre-fetch methods may be used to enhance performance and avoid latency bottlenecks associated with instruction fetching. Accordingly, it will be appreciated that any suitable manner of fetching, scheduling, and dispatching instructions may be used without departing from the scope of the present disclosure.

FIGS. 2A and 2B show a flow chart illustrating an embodiment of a method 200 for reusing an architectural poison bit during runahead according to an embodiment of the present disclosure. It will be appreciated that embodiments of method 200 may be performed by any suitable hardware, including the hardware described herein. It will be appreciated that portions of the processes described in method 200 may be omitted, reordered, and/or supplemented without departing from the scope of the present disclosure.

At 202, method 200 comprises setting first values for one or more architectural poison bits during non-runahead microprocessor operation. For example, an architectural poison bit may be set to a value indicative of the validity or invalidity of a register entry with which the architectural poison bit is associated. In some embodiments, an architectural poison bit may be set to a value indicative of whether a register entry may invalidate microprocessor correctness if the register might be used as a source register for an operation.

At 204, method 200 comprises detecting a runahead-triggering event and, at 206, causing the microprocessor to enter runahead. Any suitable long-latency event may be considered a runahead triggering event. In some embodiments, such long-latency events may be predetermined during microprocessor design. In some embodiments, entry into runahead at 206 may include checkpointing the state of the microprocessor, which may include checkpointing the register entry values and the architectural poison bits associated with those register entries. Thus, the values of the architectural poison bits are retained in the checkpointed version of the microprocessor for the duration of runahead while those values are retained, at least initially, in the working state version of the microprocessor upon entry to runahead, though one or more of those values may change during runahead as described below.

At 208, method 200 comprises determining that an instruction encountered during runahead would produce a potentially invalid result if an operation specified by the instruction is performed. Once the determination of a potentially invalid result is made, method 200 comprises, at 210 in FIG. 2B, performing a different operation from the operation specified by the instruction.

It will be appreciated that any suitable manner of determining that an instruction encountered during runahead would produce a potentially invalid result may be contemplated without departing from the scope of the present disclosure. Further, it will be appreciated that the determination may be performed in any suitable manner using any suitable logic and/or software. Likewise, it will be appreciated that performing a different operation from the operation specified by the instruction may be performed in any suitable fashion without departing from the scope of the present disclosure. FIGS. 2A and 2B depict a pair of non-limiting examples of approaches for determining potentially invalid results and performing alternative operations (shown in EXAMPLE 1 and EXAMPLE 2), which are described in more detail below. It will be appreciated that the examples described below are provided for illustrative purposes, and are not intended to limit the scope of the present disclosure.

In some embodiments, determinations about the validity of an instruction may be made prior to dispatching the instruction for execution. As shown in FIG. 2A at EXAMPLE 1, in some embodiments, determining that an instruction encountered during runahead would produce a potentially invalid result may include, at 212, determining that a register location referenced by the instruction includes an invalid entry. For example, in some embodiments, 212 may include detecting a value of an architectural poison bit associated with the register location and determining that the register entry is invalid. It will be appreciated that any suitable logic or software for detecting a value of the architectural poison bit may be employed without departing from the scope of the present disclosure. For example, a value for an architectural poison bit may be detected using scheduling logic prior to dispatching the instruction for execution in some embodiments. For example, scheduling logic included in the microprocessor may determine that an instruction will produce a potentially invalid result based on a value of an architectural poison bit indicating that a register associated with that bit includes an invalid entry.

In some embodiments, the determination may be supplemented with information related to the operation specified by the instruction. For example, if the instruction specifies an arithmetic operation referencing an input register marked as invalid by an associated architectural poison bit, information about the arithmetic operation and/or the input register may be used to determine whether the destination register will contain invalid data.

Continuing with EXAMPLE 1 in FIG. 2B, performing a different operation may include, at 214, converting the instruction to a non-operational instruction. For example, a floating point instruction associated with an architectural poison bit having an invalid value may be treated as a non-operational instruction or manipulated into a non-operational instruction. In some embodiments, all floating point instructions may be made non-operational. In some other embodiments, selected floating point instructions may be made non-operational. It will be appreciated that any suitable manner of treating the instruction as a non-operational instruction or manipulating the instruction into a non-operational instruction may be employed without departing from the scope of the present disclosure. In an example where the determination of a potentially invalid result is made at scheduling logic, in one scenario, an alternate non-operational instruction may be dispatched instead of the original instruction. In another scenario according to that example, the original instruction may be dispatched along with a bit indicating that the floating point operation is not to be performed.

In some embodiments, determinations about the validity of instructions may be made after dispatching the instruction for execution. For example, the determination may be made in an execution/pipeline stage within execution logic in the microprocessor. As shown in FIG. 2A at EXAMPLE 2, in some embodiments, determining that an instruction encountered during runahead would produce a potentially invalid result may include, at 216, determining that a destination register location referenced by the instruction will be provisioned with an invalid entry if the operation specified by the instruction is performed. It will be appreciated that any suitable logic or software for determining that the destination register location referenced by the instruction will be provisioned with an invalid entry may be employed without departing from the scope of the present disclosure. In some embodiments, a particular pipeline stage where the instruction would otherwise perform the specified operation may make such a determination. For example, at a particular execution stage in a pipeline, an instruction may specify that the quotient of two input registers is to be stored at a selected destination register. If the value of the input register corresponding to the divisor is zero, it will be determined that the value of the destination register will be invalid.

Continuing with EXAMPLE 2, upon determining that the destination register would contain an invalid entry, method 200 includes, at 218, setting an architectural poison bit associated with the destination register location to indicate that the entry is invalid. In some examples, the architectural poison bit associated with that destination register location may be set to a different value from a value held by that architectural poison bit during normal operation. For example, that architectural poison bit may initially be set to a first value, possibly a non-runahead value held over from entry into runahead, indicating that valid data is included in that register location. However, because the architectural poison bit is configured to be invisible to the microprocessor architecture during runahead, the value may be changed during runahead to a second value indicating that the register content is now invalid without causing the microprocessor to take a trap or otherwise stall due to a correctness fault.

Turning to FIG. 2B, at 220, performing a different operation may include passing the instruction to another execution stage included in the pipeline without performing the operation specified by the instruction. For example, in the division-by-zero scenario described above, the architectural poison bit corresponding to the destination register may be set to indicate that the destination register is invalid and the instruction may be passed to a subsequent execution stage included in the pipeline without being performed. Because it is known that the result of the specified operation will be invalid, performing the operation may only delay runahead; instead, runahead instruction throughput may be increased by not performing the operation at that execution stage. As another example, an operation may be partially performed, so that a portion of the operation specified by the instruction may not be performed. In one scenario according to this example, an instruction may specify a calculation and may specify that an exception should be raised on the occurrence of an exception. In this scenario, a result may be computed and an exception condition occurs. However, the exception is not raised. Thus, complete performance of the operation, as specified by the instruction, does not occur, and the instruction is passed to another stage.

Accordingly, it will be appreciated from the non-limiting examples disclosed above that architectural poison bits may be used in runahead to keep track of invalid data. Thus, an architectural poison bit associated with a data storage location used as an input for an instruction may signal that the result of that instruction may be invalid, and a different operation may be performed in its place. Further, another architectural poison bit associated with a data storage location used as a destination for that instruction may be set to a value indicating the invalidity of the data that will be stored in that location. In turn, another instruction using that destination register as input may propagate the poison, keeping track of the invalid data. It will be appreciated that determining that an instruction will produce a potentially invalid result if an operation specified by the operation is performed may occur in any suitable way, and that the behavior of the instruction may be changed in any suitable fashion. In some embodiments, such approaches may be manifested in a runahead poison policy configured to prioritize instruction throughput over delays/stalls, or to favor any other suitable policy. For example, in the scenario described above, suppressing the exception may result in a longer runahead episode relative to a policy that would cause the microprocessor to exit runahead upon encountering an exception. Thus, such approaches may potentially enhance microprocessor performance by allowing runahead to traverse additional code.

At 222, method 200 comprises determining the resolution of the runahead event and, at 224, causing the microprocessor to exit runahead upon resolution of the runahead event. For example, a load miss in L1 cache may be resolved when the data is supplied from a higher level cache to the L1 cache and is then available to be loaded.

At 226, method 200 comprises restoring the values of one or more architectural poison bits to their respective original values upon exiting runahead. In some embodiments, restoring the values for the one or more architectural poison bits may include restoring the values of the one or more architectural poison bits from a checkpointed, pre-runahead state upon exit from runahead along with checkpointed, pre-runahead values stored in associated register locations. Thus, upon restoration from the checkpointed state after runahead, the microprocessor returns to a state just prior to entry into runahead so that re-issue of the instruction triggering runahead will cause a seamless continuation of pre-runahead.

It will be appreciated that methods described herein are provided for illustrative purposes only and are not intended to be limiting. Accordingly, it will be appreciated that in some embodiments the methods described herein may include additional or alternative processes, while in some embodiments, the methods described herein may include some processes that may be reordered or omitted without departing from the scope of the present disclosure. Further, it will be appreciated that the methods described herein may be performed using any suitable hardware including the hardware described herein.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples as understood by those of ordinary skill in the art. Such other examples are intended to be within the scope of the claims.

The invention claimed is:

1. A method of operating a microprocessor, the method comprising:
   setting a value of an architectural poison bit associated with a storage location prior to entering a runahead mode of operation, wherein the value of the architectural poison bit indicating that data held at the storage location is invalid;
   causing the microprocessor to enter the runahead mode upon detection of a runahead event;
   during the runahead mode, determining that an operation associated with an instruction referencing the storage location would produce a potentially invalid result based on the value of the architectural poison bit; and
   performing a different operation in response to the determining than the operation that would produce the potentially invalid result.

2. The method of claim 1, wherein the storage location comprises an input register location referenced by the instruction.

3. The method of claim 1, wherein the performing the different operation comprises converting the instruction to a non-operational instruction.

4. The method of claim 1, wherein the determining that the operation associated with the instruction referencing the storage location would produce the potentially invalid result comprises determining the value of the architectural poison bit by scheduling logic configured to schedule the instruction for execution by the microprocessor.

5. The method of claim 1, wherein the performing the different operation comprises performing only a portion of an operation specified by the instruction.

6. The method of claim 1, further comprising:
   setting a value of an architectural poison bit associated with a destination storage location referenced by the instruction to indicate that data held at the storage location is invalid; and
   restoring the value of the architectural poison bit associated with the destination storage location referenced by the instruction to a pre-runahead value upon exiting the runahead mode.

7. The method of claim 6, further comprising:
   exiting the runahead mode upon resolution of the runahead event; and
   setting the value of the architectural poison bit associated with the destination storage location referenced by the instruction to a checkpointed value upon exiting the runahead mode.

8. A method of operating a microprocessor, the method comprising:
   setting an architectural poison bit for a storage location to a first value;
   causing the microprocessor to enter a runahead mode upon detection of a runahead event;
   determining that an operation encountered in an instruction during the runahead mode would produce a potentially invalid result if the operation is executed, the instruction being configured to store the potentially invalid result at the storage location; and
   upon determining that the potentially invalid result would result, setting the architectural poison bit for the storage location to a second value.

9. The method of claim 8, further comprising:
   causing the microprocessor to exit the runahead mode upon resolution of the runahead event; and
   restoring the architectural poison bit for the storage location to the first value upon exiting the runahead mode.

10. The method of claim 9, wherein the restoring the architectural poison bit for the storage location to the first value comprises restoring the architectural poison bit for the storage location to a checkpointed state upon exit from the runahead mode.

11. The method of claim 8, wherein the determining that the operation would produce the potentially invalid result comprises determining, at a particular pipeline stage, that a destination register location referenced by the instruction would be provisioned with an invalid entry if the operation is executed, wherein the particular pipeline stage is included in a pipeline of the microprocessor.

12. The method of claim 11, further comprising, upon determining that the potentially invalid result would result, performing only a portion of the operation.

13. The method of claim 11, further comprising, upon determining that the potentially invalid result would result, passing the instruction to another pipeline stage without performing the operation.

14. The method of claim 8, wherein the determining that the operation would produce a potentially invalid result comprises determining that an architectural poison bit associated with an input storage location associated with the instruction comprises invalid data.

15. The method of claim 8, wherein the determining that the operation would produce a potentially invalid result includes determining that an operator included in the operation would produce the potentially invalid result.

16. A microprocessor for executing instructions retrieved by fetch logic and scheduled for execution at an execution mechanism by scheduling logic, the microprocessor comprising:

runahead control logic operative to cause the microprocessor to enter a runahead mode upon detection of a runahead event; and poisoning logic operative to:
- during runahead mode, determine that an operation associated with an instruction encountered would produce a potentially invalid result,
- set a value of an architectural poison bit associated with a destination storage location referenced by the instruction to indicate that data held at the destination storage location is invalid, and
- perform a different operation in response than the operation that would produce the potentially invalid result.

17. The microprocessor of claim 16, wherein the runahead control logic is operative to cause the microprocessor to exit runahead mode upon resolution of the runahead event and wherein the poisoning logic is operative to set the value of the architectural poison bit associated with the destination storage location referenced by the instruction to a checkpointed value upon exiting from runahead mode.

18. The microprocessor of claim 16, further comprising a pipeline comprising a plurality of pipeline stages, wherein the poisoning logic is operative to cause the instruction to be passed from a first pipeline stage to a second pipeline stage without being executed at the first pipeline stage if the poisoning logic determines that the instruction would produce a potentially invalid result at the first pipeline stage.

19. The microprocessor of claim 16, where the scheduling logic comprises at least a portion of the poisoning logic.

20. The microprocessor of claim 16, where the execution mechanism comprises at least a portion of the poisoning logic.

* * * * *